United States Patent [19]
Fanney et al.

[11] Patent Number: 5,293,447
[45] Date of Patent: Mar. 8, 1994

[54] PHOTOVOLTAIC SOLAR WATER HEATING SYSTEM

[75] Inventors: A. Hunter Fanney, Gaithersburg; Brian P. Dougherty, Silver Spring, both of Md.

[73] Assignee: The United States of America as represented by the Secretary of Commerce, Washington, D.C.

[21] Appl. No.: 892,037

[22] Filed: Jun. 2, 1992

[51] Int. Cl.⁵ .......................... F24H 1/18; G05F 1/60
[52] U.S. Cl. .................................. 392/449; 219/508; 219/485; 250/215; 323/906
[58] Field of Search ................ 392/449, 468, 450–451; 323/906; 219/485, 488, 508, 509; 126/361, 615, 572; 315/149, 150, 152, 158, 159; 136/243; 250/215

[56] References Cited

U.S. PATENT DOCUMENTS

| | | | |
|---|---|---|---|
| 2,579,311 | 12/1951 | Fairey | 219/480 |
| 2,940,945 | 7/1960 | Regnier | 392/346 |
| 3,384,806 | 5/1968 | Hartman . | |
| 3,666,918 | 5/1972 | Clark, Jr. et al. . | |
| 3,696,286 | 10/1972 | Ule . | |
| 3,896,368 | 7/1975 | Rym | 323/8 |
| 4,175,249 | 11/1979 | Gruber . | |
| 4,200,783 | 4/1980 | Ehret | 392/341 |
| 4,204,147 | 5/1980 | Larrabec | 323/20 |
| 4,314,198 | 2/1982 | Rogers . | |
| 4,375,593 | 3/1983 | Winterbotham | 307/37 |
| 4,375,662 | 3/1983 | Baker | 323/906 |
| 4,390,940 | 6/1983 | Corbefin et al. . | |
| 4,404,472 | 9/1983 | Steigerwald . | |
| 4,447,712 | 5/1984 | Covillion | 219/508 |
| 4,494,180 | 1/1985 | Streater et al. | 323/906 |
| 4,551,669 | 11/1985 | Itoh et al. | 323/906 |
| 4,604,567 | 8/1986 | Chetty | 136/293 |
| 4,620,140 | 10/1986 | Chonan | 323/906 |
| 4,649,334 | 3/1987 | Nakajima . | |
| 4,651,080 | 3/1987 | Wallace | 323/906 |
| 4,873,480 | 10/1989 | Lafferty | 323/906 |
| 4,916,382 | 4/1990 | Kent . | |

FOREIGN PATENT DOCUMENTS

| | | |
|---|---|---|
| 3316775 | 11/1984 | Fed. Rep. of Germany . |
| 3335520 | 4/1985 | Fed. Rep. of Germany . |
| 2504605 | 10/1982 | France . |
| 2566610 | 12/1985 | France ........................ 392/449 |

OTHER PUBLICATIONS

"Remote Power Systems", p. 26, 1991; Atlantic Solar Products, Inc., 9351J Philadelphia Rd, P.O. Box 70060, Baltimore, Md. 21237.

Primary Examiner—Bruce A. Reynolds
Assistant Examiner—John A. Jeffery
Attorney, Agent, or Firm—Michael de Angeli

[57] ABSTRACT

A system for heating water using solar energy comprises a photovoltaic array, a water heater comprising a variable resistive load, and a controller for varying either the load characteristics of the resistive load or the power generating characteristics of the photovoltaic array, or both, to ensure maximum power transfer efficiency.

24 Claims, 4 Drawing Sheets

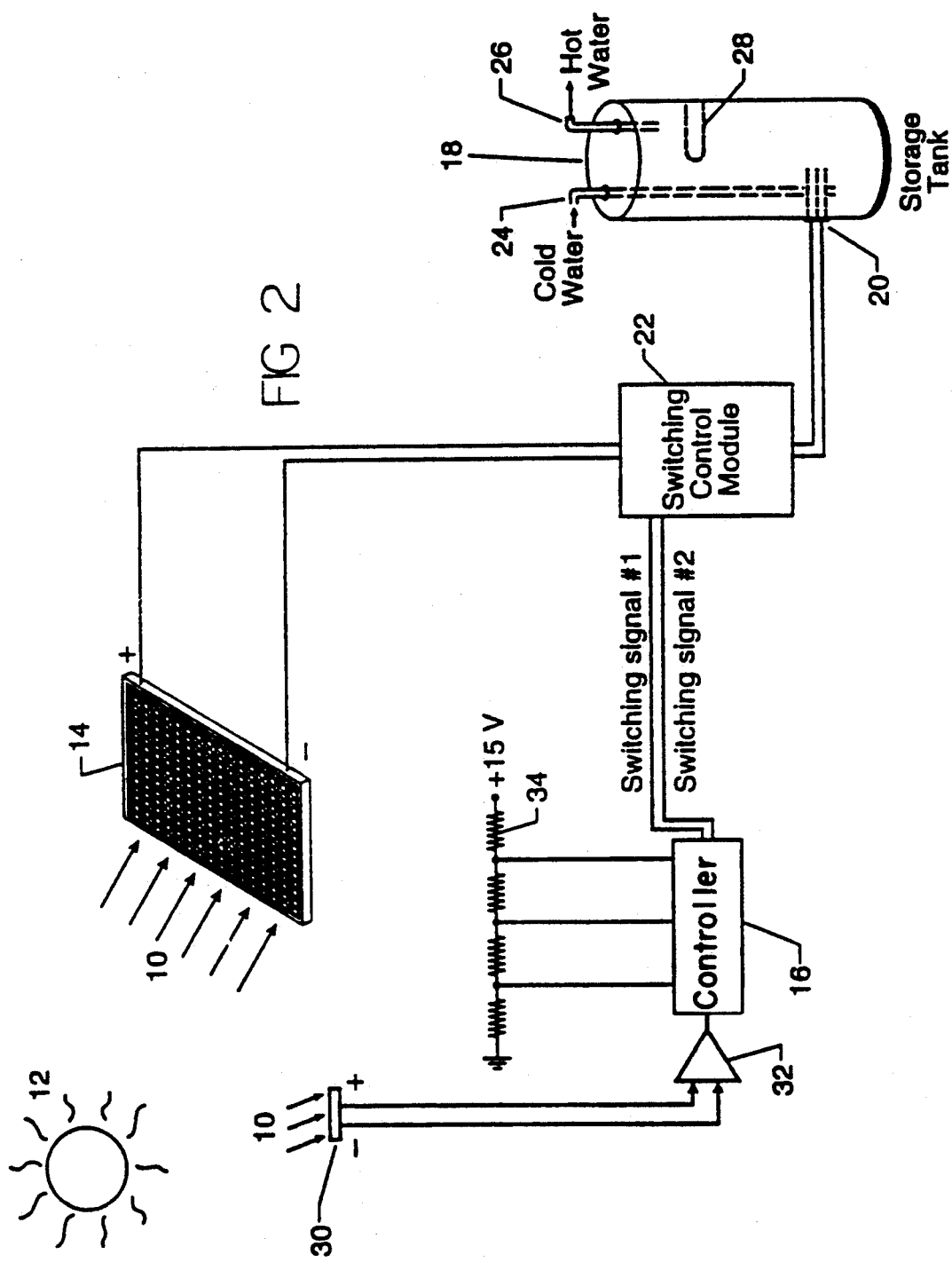

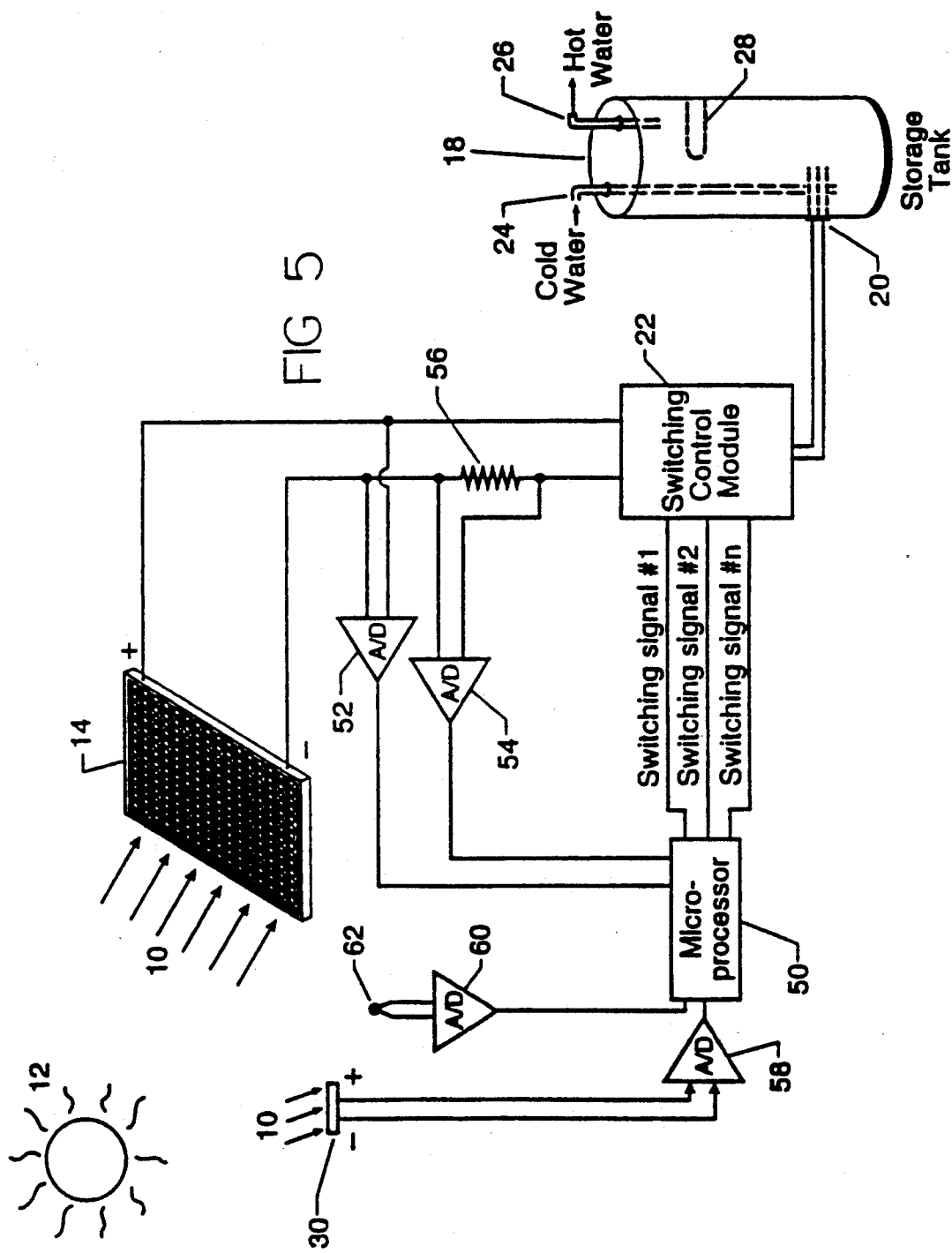

PHOTOVOLTAIC SOLAR WATER HEATING SYSTEM

BACKGROUND OF THE INVENTION

1. Field of the Invention

This invention relates to a photovoltaic solar water heater system. More particularly, this invention relates to a water heating system wherein the load characteristics of an electric water heater are matched to the power generation characteristics of a photovoltaic array for maximum efficiency in water heating using solar energy.

2. Description of the Prior Art

There has been for many years substantial interest in turning the energy of the sun into useful power for various purposes, including the heating of water for residential use. To date, solar water heaters have heated the water directly by exposure to solar radiation, for example, by pumping the water to be heated through solar collector panels. Such systems involve relatively complicated plumbing in relatively inconvenient locations, increasing initial cost and maintenance expense.

The art also teaches subjecting a photovoltaic array to solar radiation for generating electrical power for a variety of purposes, including powering conventional appliances. As such appliances are normally powered by AC power from the utility grid, while photovoltaic arrays produce DC, such systems require the use of a complex power inverter to convert the DC voltage provided by the photovoltaic array to the AC voltage provided by the electric utility. Other systems in which the photovoltaic array is not interconnected to the utility grid require the use of storage batteries to power various devices during periods of inadequate solar radiation. In particular, the art fails to teach a system in which the inherent electrical generating characteristics of the resistive load provided by an electric water heater is matched to the electrical generating characteristics of a photovoltaic array.

The art includes numerous patents directed to photovoltaic systems for generating electric power from the energy of the sun. U.S. Pat. No. 3,384,806 to Hartman teaches a system wherein a photovoltaic array is connected to a particular load by an impedance matching device. Hartman does not teach doing so specifically to power an electric hot water heater. Hartman's device includes a DC-to-DC converter which would be relatively inefficient and undesirably complicated.

U.S. Pat. No. 3,696,286 to Ule recognizes that the power generation characteristics of a particular photovoltaic array differ with varying ambient conditions, e.g., temperature and intensity of solar radiation. Ule teaches determining the voltage at which maximum power would be produced by a photovoltaic array through the use of a reference solar array, and operating the device in conjunction with storage battery so as to achieve maximum efficiency. Ule does not particularly discuss heating water using electrical power generated with a photovoltaic array.

U.S. Pat. No. 4,175,249 to Gruber teaches reconfiguring a photovoltaic array to optimize the power characteristics of the photovoltaic array in accordance with the intensity of incident solar radiation. Gruber does not particularly teach doing so in connection with powering electric water heaters.

U.S. Pat. No. 4,314,198 to Rogers teaches a solar power source for a lighting device involving a battery to be charged during peak sunlight hours and discharged during darker evening and night hours. The use of a battery to store energy is an undesired complexity in an electric water heating system.

U.S. Pat. No. 4,390,940 to Corbefin et al teaches modulation of DC power obtained from a photovoltaic array to AC and varying the rate of modulation to obtain maximum power output. DC to AC conversion (with or without varying the rate of modulation) would be an undesired complexity in any water heating system.

U.S. Pat. No. 4,404,472 to Steigerwald teaches measuring the output voltage of a photovoltaic array and withdrawing current proportional to the voltage using a variable gain device. The variable gain device is typically a DC to AC inverter in the case of an utility load, or a DC to DC converter if the load is a battery. Steigerwald does not particularly address the question of heating water using solar energy. The use of inverters and converters is undesirably complex in such a system.

U.S. Pat. No. 4,649,334 to Nakajima also teaches controllable variation in the operating parameters of a power converter connected to a photovoltaic array to obtain maximum power output. Again, such a converter is undesirably complex and in particular is not appropriate in conjunction with a resistive load such as a water heater.

U.S. Pat. No. 4,916,382 to Kent also teaches use of a converter for converting power generated by a photovoltaic array to electrical power having different voltage and current characteristics. Again, use of a power converter is an undesired complexity not appropriate for driving a purely resistive load such as a water heater.

Finally, U.S. Pat. No. 3,666,918 to Clark, Jr. et al teaches certain improvements in conventional electric water heaters.

Thus it can be appreciated that the art as discussed above does not directly address the optimization of a system for heating water using electric power generated by a photovoltaic array exposed to incident radiation from the sun.

OBJECTS AND SUMMARY OF THE INVENTION

It is therefore an object of the invention to provide a system for heating hot water using electrical power generated by a photovoltaic array, wherein the power output characteristics of the photovoltaic array and the load provided by the water heater are optimized with respect to one another, so as to obtain maximum water heating efficiency.

These and other objects of the invention are satisfied by the present invention, including a photovoltaic array for generating electrical power, a water heater with a plurality of discrete resistance elements, and a controller. Either the load characteristics of the water heater or the output power characteristics of the photovoltaic array, or both, are controlled such that maximum efficiency is achieved at all times. In one embodiment, a controller controls the connection of plural resistive elements in the water heater responsive to the sensed intensity of the incident radiation, to optimize the power output of the photovoltaic array at any given time. In another embodiment the controller controls the connection of plural resistive elements responsive to the measured power output of the photovoltaic array. In another embodiment, the configuration of the individual cells in the photovoltaic array may be reconfigured to provide power generation characteristics appropriate for the load dependent on the intensity of radiation incident at that time. In another embodiment the controller controls the configuration of the individual cells in the photovoltaic array responsive to the measured power output of the photovoltaic array.

Other objects and advantages of the present invention will become apparent from the following description of the preferred embodiments taken in conjunction with the accompanying drawings wherein like parts in each of the several figures are identified by the same reference characters.

BRIEF DESCRIPTION OF THE DRAWINGS

The invention will be better understood if reference is made to the accompanying drawings in which:

FIG. 2 is a schematic view of the system according to the invention;

FIG. 5 is a schematic view corresponding to FIG. 2 of a further embodiment of the invention.

DESCRIPTION OF THE PREFERRED EMBODIMENTS

Figure 1:
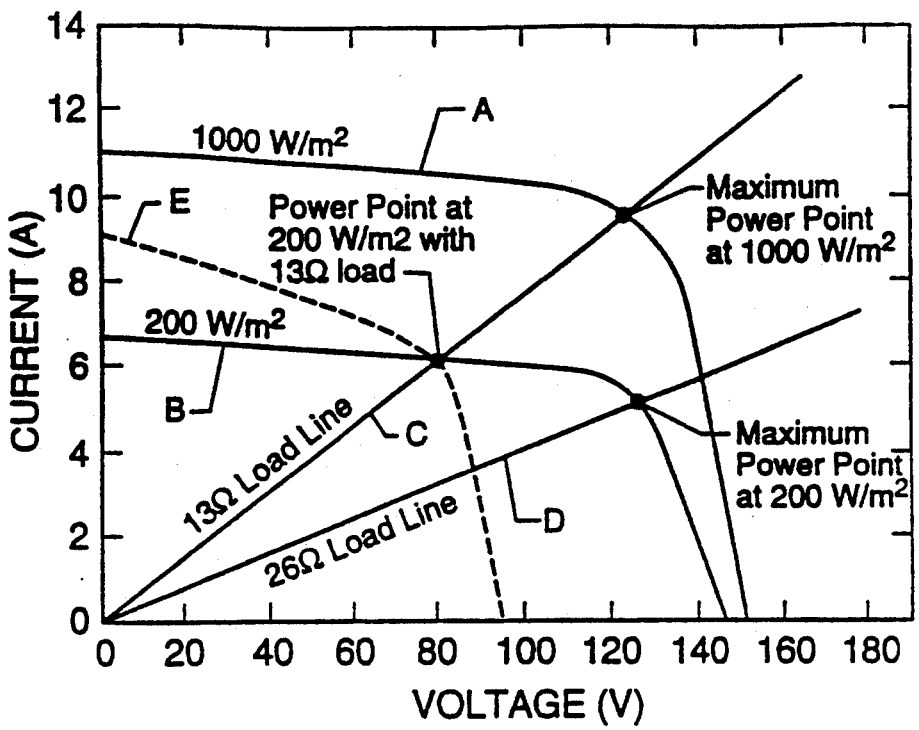
FIG. 1 is a graph of the current versus voltage characteristics of a typical photovoltaic array.

The current versus voltage characteristics of a typical photovoltaic array are depicted by a series of a characteristic "knee"-shaped curves, each curve corresponding to a different value for the intensity of incident radiation. Two such curves A and B for a particular array are shown in FIG. 1. Curve A represents a typical current versus voltage characteristic for a photovoltaic array responsive to incident solar radiation of an intensity of 1000 watts per square meter, while curve B is a similar curve for the same array responsive to incident solar radiation of an intensity of 200 watts per square meter.

As indicated by the points on curves A and B indicated by the "maximum power point" legends, the maximum power delivered by the array is achieved at a particular combination of current and voltage characteristics varying with the intensity of the incident radiation. Accordingly, power is most efficiently extracted from the array at any given time if the resistance of the load is such that the array operates at the maximum power point corresponding to the incident energy intensity. More specifically, there are drawn on FIG. 1 load lines corresponding to a 13 ohm load (line C) and a 26 ohm load (line D). For example, the 13 ohm load line C intersects the 1000 watt per square meter output line A at its maximum power point. Thus, on a relatively bright day when the array is receiving substantial solar radiation, the ideal resistive load might be 13 ohms. However, it can be seen that the 13 ohm load line C intersects the 200 watt per square meter intensity line B well away from the maximum power point of load line B. In this case, a 26 ohm load, as indicated by load line D, would be more efficient in deriving energy from the array.

Ideally the resistance of a load to be powered by a photovoltaic array would be continuously variable. However, such continuously variable resistive loads are difficult to achieve in practice, and often involve substantial energy losses. According to one aspect of the invention, therefore, a water heater including a plurality of discrete resistance heating elements is provided together with a controller responsive to a sensor sensing the intensity of the incident radiation, the controller varying the load provided by the resistive elements of the water heater to maximize the energy delivered by the photovoltaic array.

FIG. 2 shows a schematic view of the system according to one embodiment of the invention. Radiation 10 from the sun 12 is incident on a photovoltaic array 14. The photovoltaic array 14 generates electrical power responsive to incident solar energy 10. The photovoltaic array 14 includes a large number of generally conventional photovoltaic cells, as well understood by those of skill in the art.

As described above in connection with FIG. 1, the efficiency of extraction of energy from the array 14 is a function of the resistance of the load applied and of the intensity of radiation 10. According to the invention, therefore, the connection of the cells of the array 14 may be reconfigured or the resistance of the load varied in accordance with the intensity of the incident radiation 10. In the embodiment of FIG. 2, a hot water heater 18 to which the array 14 is connected comprises plural resistive elements 20 in a reconfigurable circuit configuration such that the load can be varied responsive to a control signal from a controller 16.

More specifically, energy from the array 14 is supplied to a switching control module 22 controlling the connection of plural resistive elements 20 within a hot water heater 18 responsive to control signals provided by controller 16. Heater 18 is in other respects generally conventional, and thus also includes a tank for water, an inlet for cold water 24 and an outlet for hot water 26. The heater 18 may also comprise a further heating element 28 to be connected to a residential utility power supply or the like for heating water when the intensity of incident solar radiation is inadequate to do so. The heater 18 may be employed as a preheater to supply water which has been partially heated to a downstream electric or fossil-fueled water heater.

The switching control module 22 may comprise solid-state switches or relays controlled by switching signals from controller 16. Controller 16 provides switching signals responsive to a radiation intensity signal from a photovoltaic sensor 30. Sensor 30 is shown in the embodiment of FIG. 2 as a discrete sensor, that is, separate from the array 14. However, the power actually output by the array 14 can also be measured, for example, with respect to a small number of the cells of the array 14, and used as the radiation intensity signal provided to controller 16. The output of the sensor 30 (or the output of some of the cells of the array 14 in the variation just discussed) may be amplified in amplifier 32 before being supplied to the controller 16.

In the exemplary embodiment shown, controller 16 comprises a comparator for comparing a voltage signal varying responsive to the intensity of incident radiation provided by sensor 30 to one or more reference voltages. Reference voltages may conveniently be provided by a voltage divider indicated generally at 34, including several resistors connected to a source of voltage in known fashion. Depending on the thus-determined intensity of the incident radiation, switching signals are provided by controller 16 to switching control module 22, in turn controlling the actual connection of resistive elements 20 within the hot water heater 18.

Other embodiments of the controller 16 are within the skill of the art and are within the scope of the present invention. For example, controller 16 might readily comprise an analog-to-digital converter for converting the signal proportional to the incident radiation provided by sensor 20 to a digital value and a microprocessor or similar device for accordingly controlling switching elements, such as solid state relays, comprised by the switching control module 22.

As also mentioned above, it is within the scope of the invention to reconfigure the photovoltaic array 14 (by altering the connection of groups of cells from series to parallel, for example, and vice versa) so as to alter the power characteristics of the array. For example, the 200 watts per square meter output characteristics of the "unmodified" array, depicted in curve D, could be modified by reconfiguring the array to take the shape of curve E, that is, the array could be optimized to match the 13 ohm load. It is also within the scope of the invention to vary both the circuit connections of the cells of the array 14 and the circuit connections of the resistive elements of the heater 18.

Figure 3:
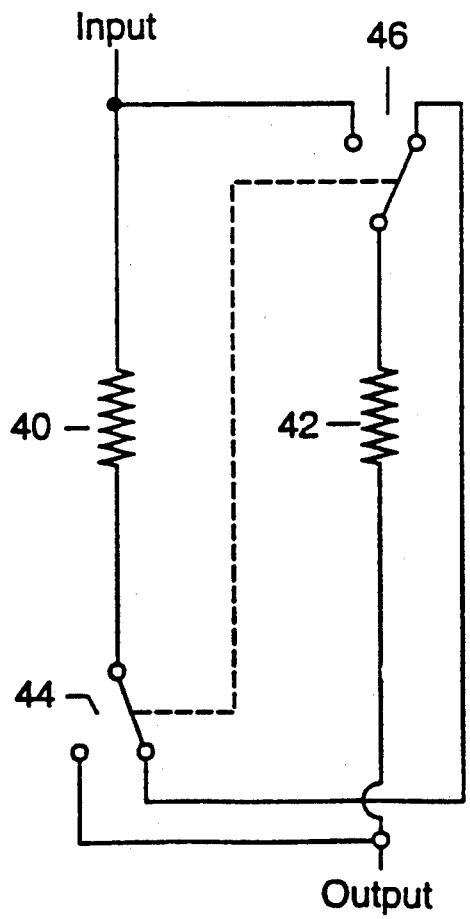
FIG. 3 is a schematic diagram of an exemplary circuit which may be configured for series, parallel, or individual operation of two resistive elements.

FIG. 3 shows an exemplary circuit for varying the connection of two discrete resistive elements 40 and 42 between connection of a single element, series connection of both elements, and parallel connection of both elements. If the two resistive elements 40 and 42 have equal 13 ohm resistance values, the circuit of FIG. 3 can be configured to provide 6.5, 13, or 26 ohm total resistance. In the configuration of the circuit shown in FIG. 3, the resistors 40 and 42 are connected in series resulting in a total resistance of 26 ohms. If the two switches 44 and 46 are moved to their alternate positions (responsive to the switching signal) the resistances 40 and 42 are then in parallel circuit configuration, so that the resistance of the overall circuit of FIG. 3 is 6.5 ohms. If only switch 44 is moved to the alternate position from that shown in FIG. 3, resistor 42 is out of the circuit, and resistance 40 would therefore provide a total resistance of 13 ohms.

Other switching arrangements for different connections of discrete resistance elements to match the particular application are considered to be within the skill of the art.

A generally similar switching circuit could be employed for reconnecting the cells of the photovoltaic array to vary its power generating characteristics.

In use of the system of the invention, therefore, a photovoltaic array 14 is connected to a switching control module 22 controlled by a controller 16. The intensity of incident radiation is sensed by a discrete sensor 30 or by measuring the output of all or a portion of the array 14, and is used to derive a signal indicative of the intensity of the incident radiation. The intensity signal is provided to controller 16 in order to either vary the load provided by the resistive heating elements, or vary the circuit configuration of the cells of the photovoltaic array, or both, so that efficiency of power transmission between the array and the resistive elements is maximized.

Figure 4:
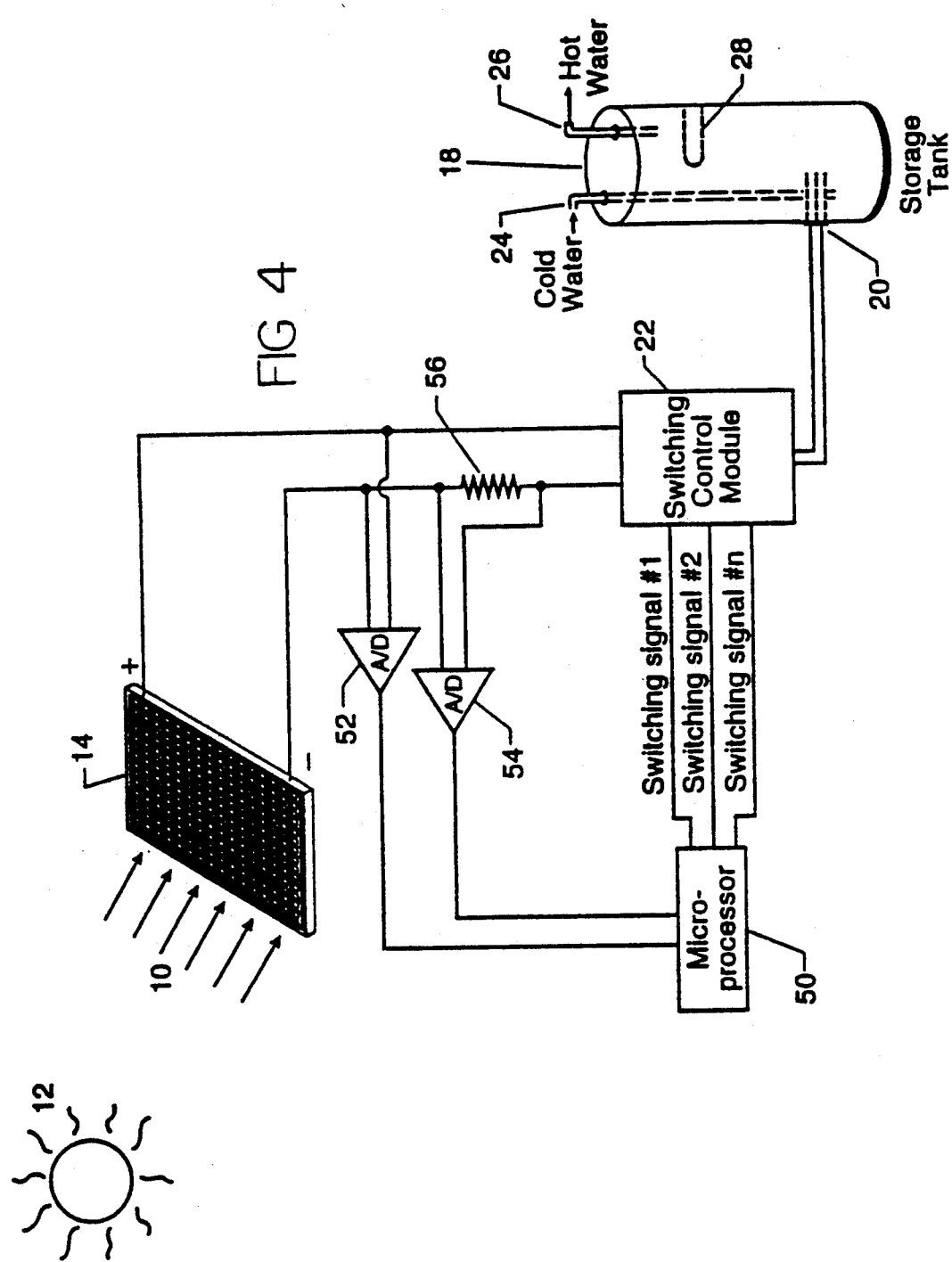
FIG. 4 is a schematic view corresponding to FIG. 2 of a further embodiment of the invention.

FIG. 4 shows a further embodiment of the system of the invention, wherein the actual power output by the photovoltaic array 14 is measured and used directly to control the connection of resistive elements 20 within a hot water heater 18. In this embodiment of the invention, the function of providing control signals to the switching control module 22 is performed by a microprocessor 50. A first analog-to-digital converter 52 is connected to measure the voltage across the output of the photovoltaic array 14 and provides a responsive digital signal to the microprocessor 50. Microprocessor 50 also receives an input from a second analog-to-digital converter 54 connected across a resistor 56 for measuring the current provided by the array 14. The microprocessor 50 effectively multiplies these two digital values together to arrive at a value for the power generated by the array 14 at any given time. The microprocessor 50 then provides control signals to the switching control module 22 to vary the connection of the resistive elements of the heater. As the total resistance of the elements connected to the array 14 varies, the microprocessor 50 continues to monitor the actual power output by the array 14, to determine the resistance providing the optimum power output from the array. The microprocessor 50 continues to monitor the photovoltaic power output. A change in output greater than a predetermined level would indicate that the irradiance on the photovoltaic array 14 and/or the ambient temperature of the array has changed, and thus that it would be appropriate to reassess the number and connection of resistive elements 20 resulting in the greatest power output. As noted above, the power output by a photovoltaic array varies with the ambient temperature. Accordingly, selection of the optimum connection of resistive elements is repeated as described above and the optimum connection implemented responsive to the change in ambient conditions.

According to a further embodiment of the invention shown in FIG. 5, the microprocessor is also provided with input signals from a third analog-to-digital converter 58 connected to a sensor 30 for providing a digital signal responsive to the intensity of the solar radiation, and from a fourth analog-to-digital converter 60 for providing a digital input value responsive to the ambient temperature as sensed by a temperature sensor 62.

Using the iterative process described above, the microprocessor 50 may determine that a particular connection of resistive elements 20 is optimal responsive to a particular incident radiation intensity level measured by sensor 30 at a particular ambient temperature measured by sensor 62. As the measured radiation and ambient temperature values typically vary over time, the microprocessor may repeat the steps of iteratively varying the connection of plural resistive elements 20 in the water heater 18 to identify the load providing the maximum power from array 14 at regular intervals or upon detection of a change in ambient temperature or radiation intensity.

In lieu of iteratively varying the switching connections of plural resistive elements in the water heater 18, the microprocessor 50 can instead similarly control various connections of the cells of the array 14 until the maximum power output for a fixed resistance is determined, generally as discussed above. Again, this process could be performed iteratively, such that various connections of the cells of the array 14 would be made and the actual output power delivered by the array measured as to each, to determine the maximum power available at a particular time. This process could be performed at regular intervals, or initiated in response to a detected change in the intensity of radiation measured by sensor 30 or ambient temperature measured by sensor 62, or a combination thereof. Of course, the connections of plural resistive elements or of plural arrangements of cells of the photovoltaic array could be varied cooperatively to determine the optimum parameters.

It will be appreciated that in the first described embodiment of the invention, the connection of (for example) the plural resistive heating elements in the water heater to the array is made in response to the actual sensed intensity of radiation; that is, the controller is designed at manufacture to control the particular connection of the elements of the resistive load or the configuration of the cells of the array responsive to sensed radiation. In the embodiment of the invention described in connection with FIGS. 4 and 5, an actual measurement is made of the power output by the array and delivered to the load under particular circumstances, and the characteristics of either the load or the array or both are iteratively adjusted to obtain the maximum power delivery under the prevailing conditions.

It will also be appreciated that the teachings of the invention could be applied to driving other purely resistive loads using power provided by a photovoltaic array. Other purely resistive loads usefully driven by a photovoltaic array controlled according to the invention could include electric heating elements disposed in a residential hot air duct or the like.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. Apparatus for heating water using energy of incident solar radiation, comprising:
   an array of photovoltaic cells for generating electrical energy responsive to incident solar radiation, the efficiency of said generation varying dependent on the intensity of the incident radiation;
   a water heater connected to said array of photovoltaic cells without intermediate electrical energy storage devices, said water heater comprising a water storage tank and a resistive heating element for heating water in said tank responsive to electric current supplied thereto, the resistance of said resistive heating element being controllably variable responsive to a control signal;
   a sensor for sensing the intensity of solar radiation incident on said array of photovoltaic cells, and for providing an intensity signal responsive to said sensed intensity; and
   a controller responsive to said intensity signal provided by said sensor for providing said control signal for controlling the resistance of said resistive heating element, so as to maximize the efficiency of generation of power by said array.

2. The apparatus of claim 1, wherein said resistive heating element comprises a plurality of individual heating elements and controllable switching means responsive to said control signal for operatively connecting said individual heating elements to said array of photovoltaic cells.

3. The apparatus of claim 1, wherein said sensor for providing an intensity signal responsive to said sensed intensity comprises means for measuring the energy generated by said array responsive to incident solar radiation.

4. The apparatus of claim 1, wherein said sensor comprises a discrete element separate from said array of photovoltaic cells for providing said intensity signal.

5. The apparatus of claim 1, wherein said controller comprises an analog-to-digital converter for converting an analog intensity signal provided by said sensor to a digital value therefor, and a digital processor responsive to said digital value for providing a control signal for controlling the resistance of said resistive heating element.

6. The apparatus of claim 1, wherein said controller comprises a comparator for comparing said intensity signal to a preset comparison signal, and for controlling the resistance of said resistive heating element responsive to said comparison.

7. Apparatus for heating water using energy of incident solar radiation, comprising:
   an array of photovoltaic cells for generating electrical power responsive to incident solar radiation, the efficiency of said generation by each said cell varying dependent on the intensity of the incident radiation;
   means responsive to a control signal for controllably connecting the cells of said array in varying circuit configurations, to vary the characteristics of power generated by said array responsive to incident solar radiation of a given intensity;
   a water heater connected to said array of cells without intermediate electrical energy storage devices, and comprising a water storage tank and resistive heating means for heating water in said tank responsive to electric current supplied thereto;
   a sensor for sensing the intensity of solar radiation incident on said array of photovoltaic cells, and for providing an intensity signal responsive to said sensed intensity; and
   a controller responsive to said intensity signal provided by said sensor for providing said control signal to said array for controlling the circuit configuration of the cells of said array in order to maximize the efficiency of generation of power thereby.

8. The apparatus of claim 7, wherein said sensor for providing an intensity signal responsive to said sensed intensity comprises means for measuring the energy generated by said array responsive to incident solar radiation.

9. The apparatus of claim 7, wherein said sensor comprises a discrete element separate from said array of photovoltaic cells for providing said intensity signal.

10. The apparatus of claim 7, wherein said controller comprises an analog-to-digital converter for converting an analog intensity signal provided by said sensor to a digital value therefor, and a digital processor responsive to said digital value for providing said control signal for controlling the circuit configuration of the cells of said array.

11. Apparatus for driving a resistive load using energy of incident solar radiation, comprising:
   an array of photovoltaic cells for generating electrical power responsive to incident solar radiation, the efficiency of said generation varying dependent on the intensity of the incident radiation;
   a purely resistive load connected to said array of cells, said load comprising a number of individual heating elements to be driven by electric current supplied thereto;
   means for controllably connecting said individual heating elements in various circuit configurations, whereby the resistance of said load may be selected from a plurality of discrete values;

a sensor for sensing the intensity of solar radiation incident on said array of photovoltaic cells, and for providing an intensity signal responsive to said sensed intensity;

a controller responsive to said intensity signal provided by said sensor for providing a control signal; and means responsive to said control signal for controllably selecting at least one of the circuit configuration of said cells of said array and the resistance of said resistive load, whereby the power generated by said array is matched to the characteristics of said load responsive to the sensed intensity of solar radiation incident on said array.

12. The apparatus of claim 11, wherein said resistive load comprises a water heater, comprising a water storage tank and plural resistive heating elements for heating water in said tank responsive to electric current supplied thereto.

13. The apparatus of claim 11, wherein said array of photovoltaic cells comprises controllable switches for selectively connecting the cells of said array in varying circuit configurations responsive to said control signal, to control the characteristics of power generated by said array responsive to the measured intensity of incident solar radiation.

14. The apparatus of claim 11, further comprising temperature sensor means for sensing the ambient temperature in the vicinity of said array of cells, and for supplying a temperature signal responsive thereto to said controller, and wherein said controller is responsive to both said temperature signal and said intensity signal.

15. A method for heating water using energy of solar radiation, comprising the steps of:

storing water in a storage tank, said tank comprising a resistive electric heating means comprising plural separately connectable discrete heating elements in thermal contact with said water in said tank;

exposing a photovoltaic array to incident solar radiation, said array comprising a number of separately connectable cells, each cell generating power responsive to incident solar radiation;

connecting said array to said resistive means;

measuring the intensity of solar radiation incident on said array; and controlling at least one of the connection of said cells within said array and the connection of said plural discrete heating elements of said resistive electric heating means responsive to the measure intensity of the incident radiation, whereby the load provided by said resistive electric heating means is matched to the characteristics of power generated by said array in order to maximize the efficiency of heating water by incident solar radiation.

16. The method of claim 15, wherein said step of controlling comprises the step of connecting discrete heating elements of said resistive electric heating means to said array responsive to a control signal.

17. The method of claim 16, further comprising the step of generating said control signal responsive to comparison of the measured intensity of the incident solar radiation to a predetermined reference value.

18. The method of claim 15, wherein said step of controlling comprises the step of varying the circuit connection of the cells of said array responsive to a control signal.

19. The method of claim 18, further comprising the step of generating said control signal responsive to comparison of the measured intensity of the incident solar radiation to a predetermined reference value.

20. A method for driving a resistive load using energy of solar radiation, comprising the steps of:

exposing a photovoltaic array to incident solar radiation, said array comprising a number of cells connected to one another, each cell generating power responsive to incident solar radiation;

connecting said array to said resistive load;

measuring the actual power provided to said load by said array; and controlling at least one of the connection of said cells within said array and the connection of plural discrete resistive elements of said resistive load responsive to the measured power output by the array.

21. The method of claim 20, wherein said such step of measuring the power generated by said array comprises the step of measuring the voltage across the array and the current generated by the array when connected to a particular resistive load.

22. The method of claim 21, wherein said step of measurement of the voltage across and current generated by the array is performed by microprocessor means connected to analog-to-digital converter means providing voltage and current measurement signals.

23. The method of claim 22, comprising the further steps of repetitively measuring the intensity of solar radiation incident on said array and the ambient temperature in the vicinity of said array, and varying at least one of the load applied to the array and the configuration of cells in the array responsive to detected changes in the intensity of incident solar radiation or the ambient temperature, to determine the optimal connection of said array to said load under particular conditions of incident radiation and ambient temperature.

24. The method of claim 23, wherein at least one of the total resistance provided by the resistive load and the connection of cells in the array is iteratively varied, and the power output by the array is measured in response to each such variation, to determine the parameters at which power is most efficiently provided from said array to said resistive load.

* * * * *